United States Patent
Yang et al.

(10) Patent No.: US 10,757,955 B2
(45) Date of Patent: Sep. 1, 2020

(54) METHOD FOR PREPARING TEA LEAF EXTRACTS HAVING DIFFERENT TASTES AND BEVERAGES CONTAINING COMBINATIONS OF SAME

(71) Applicant: THE COCA-COLA COMPANY, Atlanta, GA (US)

(72) Inventors: Xiaogen Yang, Elk Grove, CA (US); Gooden Wei, Shanghai (CN); Richard Huang, Shanghai (CN); Amy Song, Shanghai (CN)

(73) Assignee: THE COCA-COLA COMPANY, Atlanta, GA (US)

( * ) Notice: Subject to any disclaimer, the term of this patent is extended or adjusted under 35 U.S.C. 154(b) by 311 days.

(21) Appl. No.: 15/520,101

(22) PCT Filed: Oct. 22, 2015

(86) PCT No.: PCT/IB2015/001957
§ 371 (c)(1),
(2) Date: Apr. 19, 2017

(87) PCT Pub. No.: WO2016/063121
PCT Pub. Date: Apr. 28, 2016

(65) Prior Publication Data
US 2017/0311619 A1    Nov. 2, 2017

(30) Foreign Application Priority Data
Oct. 22, 2014    (CN) .......................... 2014 1 0569472

(51) Int. Cl.
*A23F 3/16*    (2006.01)
*A23F 3/40*    (2006.01)
*A23F 3/34*    (2006.01)

(52) U.S. Cl.
CPC .................. *A23F 3/16* (2013.01); *A23F 3/34* (2013.01); *A23F 3/40* (2013.01)

(58) Field of Classification Search
CPC ................. A23F 3/16; A23F 3/34; A23F 3/40
See application file for complete search history.

(56) References Cited

U.S. PATENT DOCUMENTS 2,785,979 A * 3/1957 Mitchell .................... A23F 3/16
                                                                    426/477
3,911,145 A * 10/1975 Marion .................... A23F 3/405
                                                                    426/386

(Continued)

FOREIGN PATENT DOCUMENTS

CA    2 914 836 A1    12/2014
CN    102919427 A    2/2013

(Continued)

OTHER PUBLICATIONS

Gudala, "Effect of Extraction Parameters on Polyphenols of Caffeinated and Decaffeinated Green Tea," University of Wisconsin—Stout, A Research Paper Submitted in Partial Fulfillment of the Requirements for the Master of Science Degree in Food and Nutritional Sciences, pp. i-x, 1-88.

(Continued)

*Primary Examiner* — Anthony J Weier
(74) *Attorney, Agent, or Firm* — Eversheds Sutherland (US) LLP

(57) ABSTRACT

Included in the present invention are a method for preparing tealeaf extracts having different tastes, and a beverage prepared using extracts made by the method. The method involves adding tealeaves to an extraction column, performing continuous extraction using water at 5° C.-140° C. at a flow rate of 20-200 mL/min, collecting liquid extracts in sections, and drawing a relative taste intensity curve; and according to a taste variation shown in the relative taste (Continued)

intensity curve, recombining collected liquid extracts of different sections. The method of the present invention can produce tealeaf extracts having high grade taste and high concentration without the need for a concentration step, the extraction yield is high, and the sensory attributes of the tealeaf extracts can be rebalanced in a very flexible manner, so as to obtain beverages of different tastes.

12 Claims, 7 Drawing Sheets

(56) References Cited

U.S. PATENT DOCUMENTS

| | | | | |
|---|---|---|---|---|
| 4,357,361 | A | * | 11/1982 | Lunder ............ A23F 3/34 426/435 |
| 4,410,556 | A | * | 10/1983 | Lunder ............ A23F 3/34 426/435 |
| 4,673,580 | A | * | 6/1987 | Matsuda ........... A23F 5/505 426/385 |
| 5,198,259 | A | * | 3/1993 | Hoogstad .......... A23F 3/18 426/388 |
| 6,387,428 | B1 | * | 5/2002 | Kinugasa .......... A23F 3/163 426/435 |
| 6,423,361 | B1 | | 7/2002 | Lehmberg et al. |
| 7,232,585 | B2 | | 6/2007 | Quan et al. |
| 7,510,736 | B2 | * | 3/2009 | Bazinet ............ C07D 311/62 426/431 |
| 7,544,378 | B2 | | 6/2009 | Yamada |
| 7,811,619 | B2 | | 10/2010 | Itaya et al. |
| 7,981,449 | B2 | | 7/2011 | Sugiyama et al. |
| 8,440,246 | B2 | | 5/2013 | Fukuda et al. |
| 9,198,946 | B2 | | 12/2015 | Ogura et al. |
| 9,265,276 | B2 | | 2/2016 | Bortlik et al. |
| 2003/0077374 | A1 | | 4/2003 | Ohishi et al. |
| 2005/0008753 | A1 | | 1/2005 | Honda et al. |
| 2005/0084574 | A1 | | 4/2005 | Yamada |
| 2005/0186314 | A1 | | 8/2005 | Sasame et al. |
| 2007/0178175 | A1 | | 8/2007 | Matsubara et al. |
| 2007/0292560 | A1 | * | 12/2007 | Quan ............... A23F 3/163 426/3 |
| 2010/0021615 | A1 | | 1/2010 | Sato et al. |
| 2010/0233322 | A1 | | 9/2010 | Fukuda et al. |
| 2011/0104358 | A1 | | 5/2011 | Furuta et al. |
| 2011/0269851 | A1 | | 11/2011 | Bortlik et al. |
| 2012/0121761 | A1 | | 5/2012 | Fukuda et al. |
| 2012/0315368 | A1 | | 12/2012 | Terazawa et al. |
| 2014/0295049 | A1 | | 10/2014 | Ragot et al. |

FOREIGN PATENT DOCUMENTS

| | | | |
|---|---|---|---|
| CN | 104640460 | A | 5/2015 |
| CN | 107821686 | A | 3/2018 |
| EP | 1836899 | A1 | 9/2007 |
| JP | 200321010 | A | 7/2003 |
| JP | 2013078338 | A | 5/2013 |
| WO | 2006/013930 | A1 | 2/2006 |
| WO | WO2009/107179 | * | 3/2009 |
| WO | 2011108311 | A1 | 9/2011 |
| WO | 2011126003 | A1 | 10/2011 |

OTHER PUBLICATIONS

International Search Report and Written Opinion for PCT/IB2015/001957, dated Feb. 11, 2016.

* cited by examiner

METHOD FOR PREPARING TEA LEAF EXTRACTS HAVING DIFFERENT TASTES AND BEVERAGES CONTAINING COMBINATIONS OF SAME

CROSS REFERENCE TO RELATED APPLICATIONS

This application is a 35 U.S.C. § 371 National stage application of International Patent Application No. PCT/IB2015/001957, filed Oct. 22, 2015, which claims priority benefit of CN 201410569472.9, filed Oct. 22, 2014, which is incorporated by reference herein in its entirety.

TECHNICAL FIELD

The present invention relates to a method for preparing tealeaf extracts having different tastes, and a beverage made using liquid extracts obtained by the method as starting materials.

BACKGROUND ART

Extraction is an indispensable process step in the production of tea powders and ready-to-drink (RTD) beverages. In the prior art, many extraction technologies have been developed or proposed (e.g. microwave-assisted or ultrasound-assisted extraction, ultra-high-pressure extraction), but one type that is used widely in industry is a hot water extraction method based on a batch treatment method, e.g. in-tank extraction and metal grid extraction. In general, for the production of a 1× concentrated liquid which can be used directly to manufacture an RTD beverage product, one or two batches may be sufficient in a hot water extraction method using batch treatment, e.g. primary liquid production. In order to prevent undesired components (mainly having bitter and astringent tastes) from entering the final extract, the use of a short extraction time (10 to 30 minutes) and a relatively low temperature (representatively 50° C.-80° C.) becomes a necessary condition. Furthermore, to maintain a high extraction yield, the ratio of water to starting material must be high (e.g. 50:1). In general, the batch treatment method is indeed a simple, quick and low-cost extraction process method. However, these advantages of the batch treatment method are at the expense of aroma, concentration and extraction efficiency. The strength of aroma in a tealeaf liquid prepared by the method is low, not only because of the loss due to volatilization that is widely believed to occur during extraction, but also because of a low extraction yield caused by low temperature and short contact time, as well as the use of polar solvents for non-polar aromatic components in tealeaves. Clearly, a significant amount of aromatic substances are retained in the starting material after batch extraction.

Thus, a need has developed for a technique capable of imparting desired sensory properties to tea concentrate. Although a 1× concentrated liquid (<1 degree Brix) obtained by a conventional extraction method (such as the batch extraction method) is sufficient in the case of the production of primary liquid or similar products, a high concentration step is inevitable in the case of the production of concentrates. In the prior art, a large amount of water must be removed in the concentration step, and this will not only consume a large amount of energy, but also lead to huge wastage of aromatic substances and a change in the sensory properties of the final product. Moreover, when the batch extraction method is used, it is also very difficult to prevent undesired attributes in the starting material (e.g. bitter and astringent taste attributes) from entering tea solution from leachate.

Another method of producing tea extract is column extraction. A column body is packed with tealeaves, and hot water enters via the column bottom and passes through the entire column. A concentrated tealeaf extract exits through a top end of the column, and is rapidly cooled to room temperature or below. An advantage of the method is that a tealeaf concentrate (e.g. 5-20 degrees Brix) can be produced without an additional concentration step, so that aromatic substances in tealeaves are retained very well in the production process.

Although documents in China and abroad have disclosed the manufacture of a liquid tea extract using a column extraction method with water as a solvent, the method used therein to treat the liquid extract is direct discharge thereof, and the objective thereof is to make the extraction efficiency of at least one substance in the liquid extract higher. In the present invention, on the other hand, eluent is collected in sections continuously according to the elution volume, to achieve separation of tastes, and collected liquid extracts of different sections can also be recombined to obtain products of different tastes according to the taste variation shown in a relative taste intensity curve.

CONTENT OF THE INVENTION

The technical problem to be solved by the present invention is to provide a method for preparing tealeaf extracts having different tastes. The method utilizes column extraction technology, and elutes tealeaves using water; eluent is collected in sections continuously, thereby achieving separation of tealeaf tastes, and products of different tastes can be obtained by recombining different liquid extracts according to a relative taste intensity curve.

To solve the above technical problem, the present invention employs the following technical solution:

The present invention provides a method for preparing tealeaf extracts having different tastes, the method comprising the following steps:

1) packing tealeaves into an extraction column, performing continuous extraction using water at 5° C.-140° C. at a flow rate of 20-200 mL/min, collecting liquid extracts in sections, and drawing a relative taste intensity curve; wherein the relative taste intensity curve is selected from a bitter taste curve, an astringent taste curve, an umami curve, a sweet aftertaste curve or a combination thereof;
2) according to a taste variation shown in the relative taste intensity curve, recombining collected liquid extracts of different sections, thereby obtaining tealeaf extracts having different tastes.

Furthermore, the method of the present invention also comprises mixing with milk, fruit juice or plant extract after recombining collected liquid extracts of different sections, so as to obtain beverages with a greater number of tastes.

Furthermore, in the present invention, the plant extract is a conventional plant extract for adding to a beverage, including but not limited to an extract of *chrysanthemum*, goji or *Siraitia grosvenorii*.

Furthermore, the tealeaves used in the present invention include green teas such as unfermented longjing, biluochun and zhuye qing; black teas such as lapsang souchong, broken black tea and keemun black tea; dark teas such as pu-erh, qizi bing and qing zhuan tea; oolong teas such as wuyi yan tea and tieguanyin; yellow teas such as junshan yinzhen and mengding huangya; white teas such as yinzhen baihao and gong mei; or a mixture comprising a combination of 2 or more thereof. Green or black tea is preferably used.

The extraction system used in the method of the present invention is shown in FIG. 1. The present invention employs a cylindrical extraction column to perform extraction, preferably a closed cylindrical extraction column. Tealeaves are poured into the extraction column, and extracting water is passed from one end of the extraction column to the other end to perform extraction; water is preferably passed from a bottom end of the extraction column to a top end to perform extraction. By way of this extraction system, the present invention achieves separation of tealeaf tastes. In the present invention, "tastes" generally refer to a "bitter taste", an "astringent taste", "umami" and a "sweet aftertaste".

Said "bitter taste" refers to an unpleasant, sharp or intolerable sensation; the main sources of the bitter taste in tealeaves are alkaloids, anthocyanidins and tea saponins, etc.

Said "astringent taste" refers to a sensation of constriction which occurs when proteins in the mouth harden as a result of irritation. The main sources of the astringent taste are tea polyphenols, tannin and EGCG.

Said "umami" refers to a gustatory taste triggered by compounds such as glutamic acid; the main sources of this taste are glutamic acid, theanine, 5-inosinic acid, 5'-guanylic acid, sodium inosinate, sodium guanylate or sodium glutamate etc.

Said "sweet aftertaste" is a pleasant sensation caused by sugar. Certain proteins and some other special non-sugar substances will also give rise to a sweet taste. Sweetness is generally associated with formyl groups and ketone groups connected to carbonyl groups.

The method of the present invention for preparing tealeaf extracts having different tastes is explained in detail below.

The present invention achieves recombination of tealeaf tastes by drawing a relative taste intensity curve for bitter taste, astringent taste, umami and sweet aftertaste, to obtain products of different tastes. Specifically, the method of drawing the relative taste intensity curve is as follows:
1) using collected liquid extracts of different sections as samples;
2) using as a reference a brew obtained by adding hot water at 70° C.-80° C. at a mass ratio of tealeaves to water of 1:50 and steeping for 10 minutes;
3) formulating the samples and the reference to be of a single concentration;
4) performing, by an evaluation group, sensory evaluation of the samples obtained in step 3), wherein the evaluation group is composed of at least 5 professional judges, who score the strengths of the bitter taste, astringent taste, umami and sweet aftertaste of each sample, and take a mean value as a final score which is the relative taste intensity of the sample;
wherein the strengths of the bitter taste, astringent taste, umami and sweet aftertaste are each set to 0 points-10 points from low to high (11 points in total), wherein 0-2 points is low, 2-4 points is medium-low, 4-6 points is medium, 6-8 points is medium-high, 8-10 points is high, and the strength of each taste of the reference obtained in step 3) is set to 5;
5) drawing a relative taste curve, with the mass ratio of water to tealeaves as the horizontal coordinate and the relative taste intensity of the sample as the vertical coordinate.

The present invention may also obtain a better taste differentiation result and a higher extraction yield by adjusting extraction parameters.

In the present invention, the temperature of the extracting water is preferably 40° C.-100° C., more preferably 60° C.-90° C.

In the present invention, the flow rate of water is preferably 50-150 mL/min; if the flow rate is too high, swelling of the tealeaves is not uniform, but if the flow rate is too low, the extraction time will be extended, and production efficiency will be low.

In the present invention, the extracting water preferably flows from the bottom of the column to the top; by having water flow from the bottom to the top, blockage due to compaction of tealeaves is avoided, thereby improving the extraction yield.

In the present invention, the pressure during extraction is preferably 0.1 Mpa-2 Mpa, more preferably 0.1 Mpa-1 Mpa.

In the present invention, the temperature, flow rate and pressure preferably vary linearly or non-linearly during extraction.

In the present invention, the particle diameter of the tealeaves is 10-100 mesh.

In the beverage prepared by the present invention, to match the taste of tealeaves, it is also possible to add additives such as antioxidants, flavorings, various esters, organic acids, colorings, emulsifiers, preservatives, seasonings, sweeteners, acidulants, vitamins, amino acids, vegetable extracts, quality stabilizers and pH regulators; these may be added alone or in combination.

The method of the present invention is similarly suitable for other herbaceous or woody plants possessing tastes, such as *chrysanthemum*; any herbaceous plant extracts and woody plant extracts made by the method and possessing different tastes, as well as beverages obtained by recombination thereof, are included in the scope of protection of the present invention.

The beneficial effects of the present invention are as follows:

In the method of the present invention, by collecting liquid extracts in sections and drawing a relative taste curve thereof, and by analyzing the relative taste curve, it is found that in an early-stage liquid extract, desired sensory attributes such as umami attributes are strengthened, whereas other undesired components occurring in tealeaves such as bitter and astringent tastes are eluted out in a later stage, thereby achieving separation of tastes. Thus liquid tea extracts having excellent taste and high concentration can be produced without the need for a concentration step, and the extraction yield is high.

The concentration of the product of the present invention can reach 8-20 degrees Brix, whereas the concentration of a traditional tea brew is less than 1 degree Brix; the extraction yield of the present invention can reach 38%, whereas the extraction yield of traditional batch extraction is about 25%. Thus, the method of the present invention not only saves energy, it also prevents the taste quality of the product from being affected by chemical changes caused by heating in a concentration process.

Furthermore, in the method of the present invention, collected liquid extracts of different sections are recombined or mixed with milk, fruit juice or plant extract, according to taste variation shown in the relative taste intensity curve; thus the sensory attributes of the liquid tea extracts can be rebalanced in a very flexible manner, so as to obtain beverages of different tastes.

DESCRIPTION OF THE ACCOMPANYING DRAWINGS

Particular embodiments of the present invention are explained in further detail below in conjunction with the accompanying drawings.

PARTICULAR EMBODIMENTS

To explain the present invention more clearly, the present invention is explained further below in conjunction with preferred examples and the accompanying drawings. Those skilled in the art should understand that the content specifically described below is illustrative, not limiting, and should not be used to limit the scope of protection of the present invention.

Example 1

Method for Preparing Green Tea Extracts Having Different Tastes 400 g of green tea tealeaves with a particle diameter of 16-32 mesh are packed into an extraction column, hot water at 60° C. is supplied continuously at a flow rate of 100 mL/min to perform extraction; once extraction begins, liquid extract is collected immediately until the volume ratio of water to tea is 1:1, to obtain a first-section liquid extract; second- to ninth-section liquid extracts are collected by the same principle according to the same volume ratio of water to tea.

The pressure during extraction is 0.1 Mpa-2 Mpa.

Figure 1:
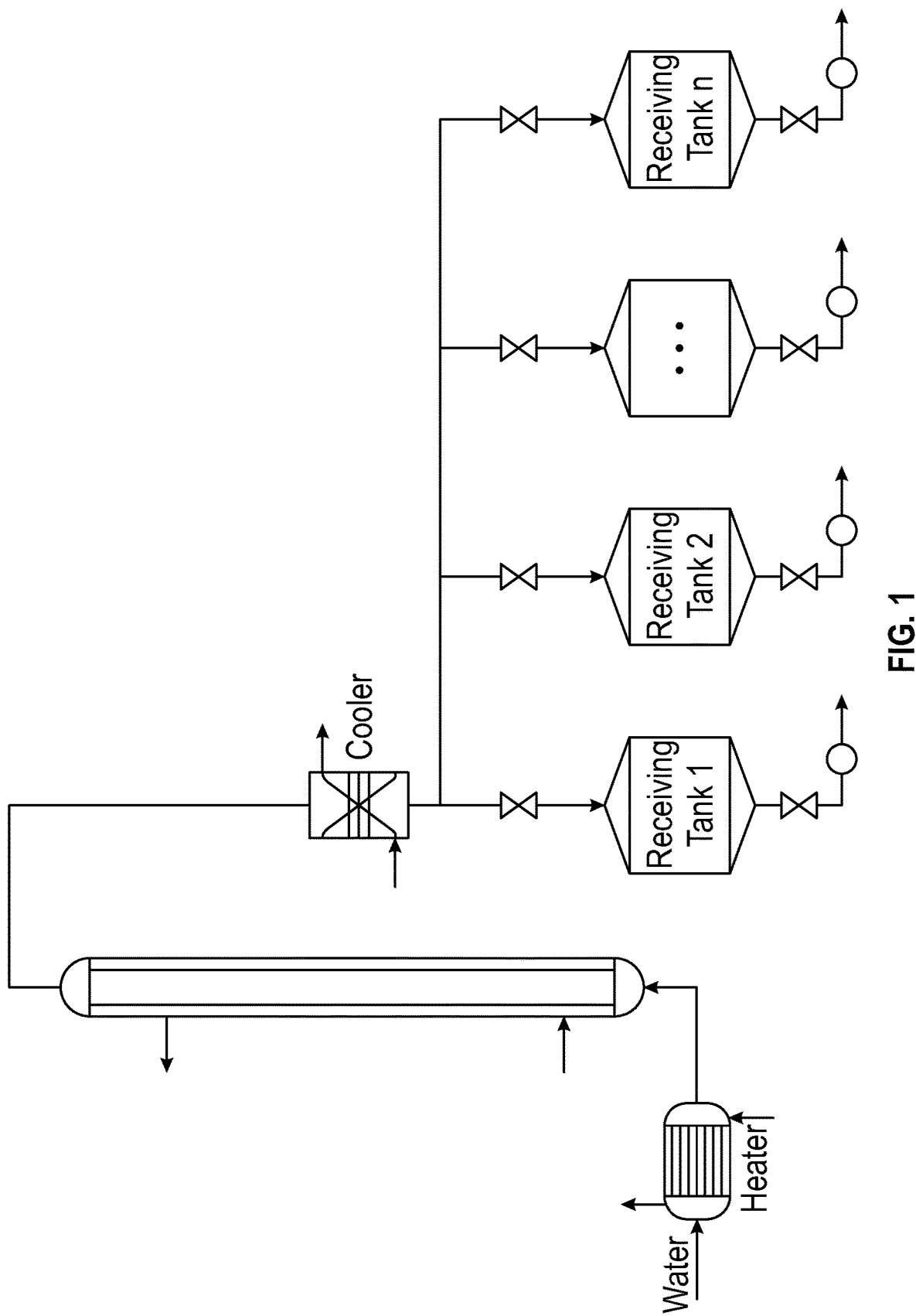
FIG. 1 is a schematic diagram of the extraction system of the present invention.
Figure 2:
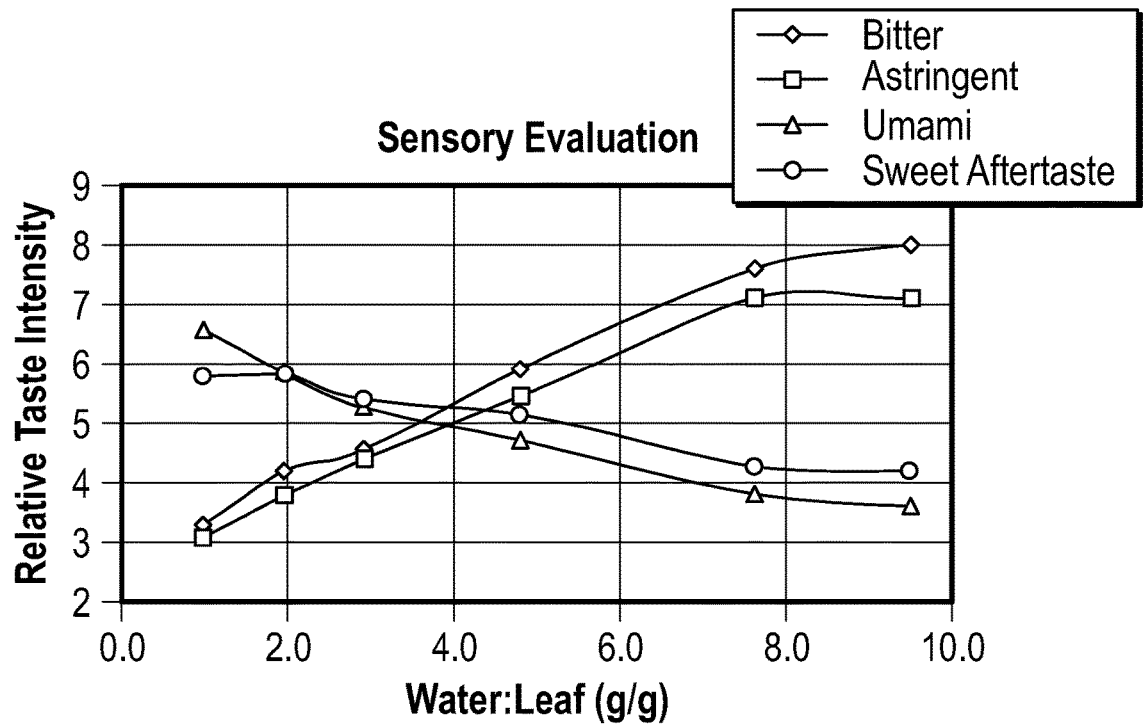
FIG. 2 is a relative taste intensity curve for a green tea liquid extract.

Relative taste curves for bitter taste, astringent taste, umami and sweet aftertaste are drawn:

1) the 9 portions of liquid extract are used as samples;
2) a green tea brew obtained by adding hot water at 70° C. at a mass ratio of tea to water of 1:50 and steeping for 10 minutes is used as a reference;
3) the samples and the reference are formulated to be of a single concentration of 0.2 Brix;
4) an evaluation group performs sensory evaluation of the samples obtained in step 3), wherein the evaluation group is composed of 10 professional judges, who score the strengths of the bitter taste, astringent taste, umami and sweet aftertaste of each sample, and take a mean value of the scores as a final score which is the relative taste intensity of the sample;
5) a relative taste curve is drawn, with the mass ratio of water to tealeaves as the horizontal coordinate and the relative taste intensity of the sample as the vertical coordinate, as shown in FIG. 2.

It can be seen from FIG. 2 that in an initial stage of extraction, the taste attributes of the green tea liquid extract are principally umami and a sweet aftertaste; as the elution volume gradually increases, the umami and sweet aftertaste gradually decrease, while the bitter taste and astringent taste gradually increase, so that finally the bitter taste and astringent taste are the principal tastes.

According to the taste variation shown in FIG. 2, the first 5 portions of green tea liquid extract are recombined to form a tea syrup solution which has the taste and aroma of concentrated classic oolong green tea, as well as having the sensory quality of high grade authentic brewed tea and giving an outstanding consumption experience.

Furthermore, the present invention also determined the concentration of amino acids, total polyphenols, EGCG and caffeine in the 9 collected samples, to analyze the correlation between these 4 substances in the green tea and the taste of the green tea liquid extract.

The present invention determined the relative concentration of each of these 4 substances by an LC-MS method; the results are shown in FIGS. 3-6.

Figure 3:
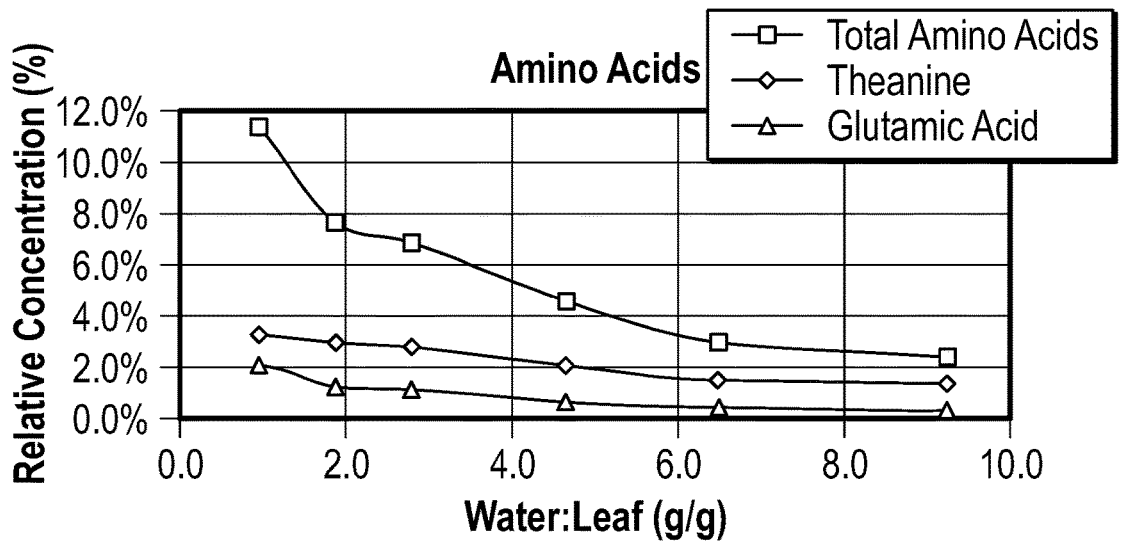
FIG. 3 is a curve of variation in relative concentration of amino acids during extraction of green tea.

FIG. 3 shows that the relative concentration of amino acids is higher in an early extraction stage, then rapidly falls. The main source of the umami in green tea is glutamic acid; the trend of variation in relative concentration of amino acids in FIG. 3 is similar to the trend of variation in the umami in FIG. 2.

Figure 4:
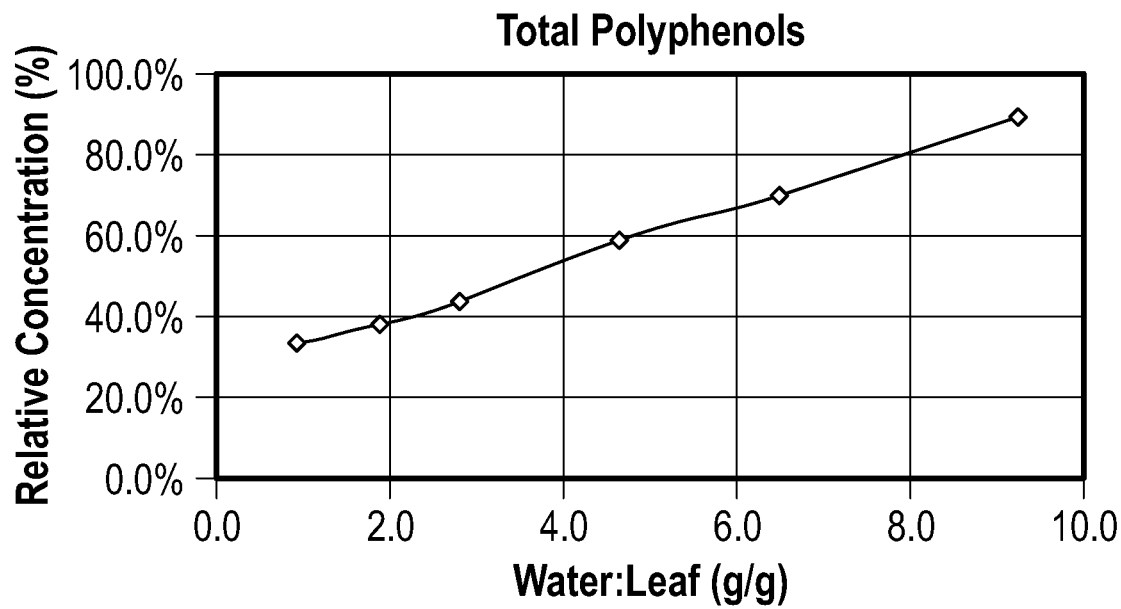
FIG. 4 is a curve of variation in relative concentration of total polyphenols during extraction of green tea.
Figure 5:
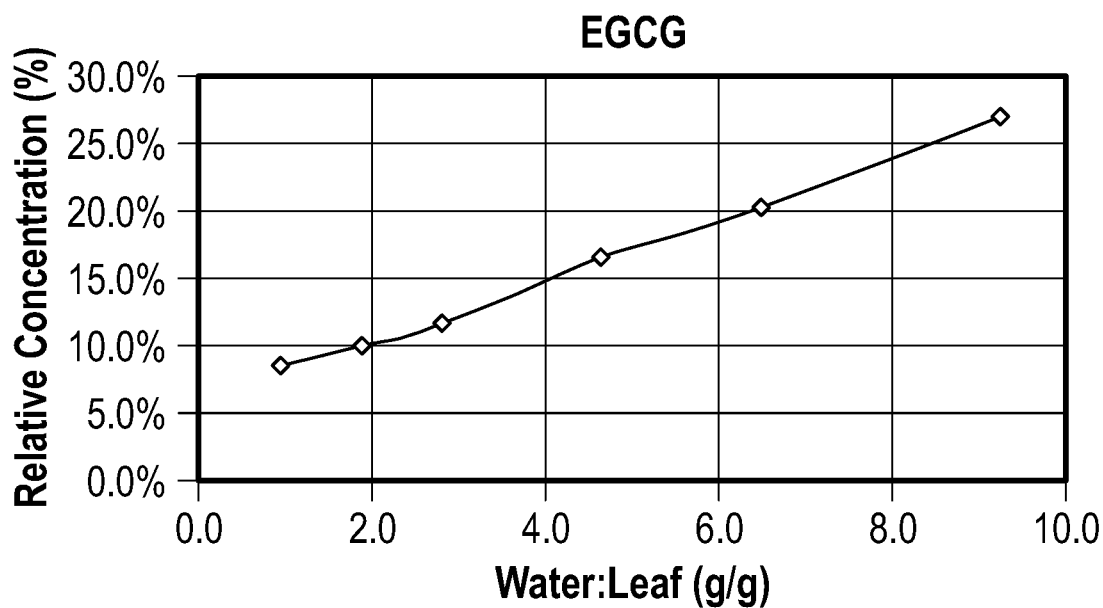
FIG. 5 is a curve of variation in relative concentration of EGCG during extraction of green tea.
Figure 6:
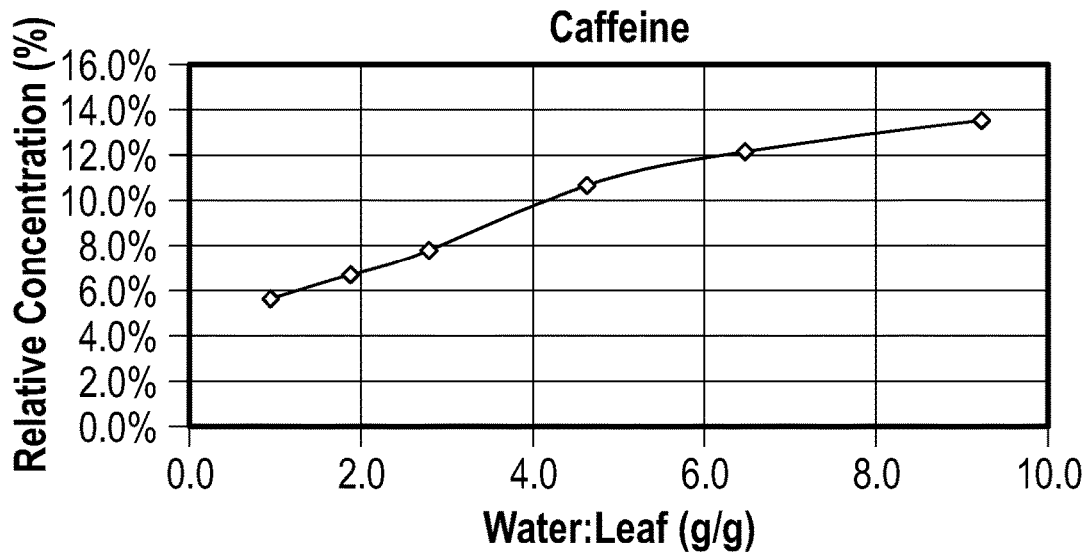
FIG. 6 is a curve of variation in relative concentration of caffeine during extraction of green tea.

FIGS. 4-6 show curves of variation in relative concentration of total polyphenols, EGCG and caffeine. As can be seen from FIGS. 4-6, the relative concentrations of these three substances are lower in an initial stage, then rise considerably. These three substances are the main sources of the bitter and astringent tastes in green tea, and have similar trends of variation to those of bitter and astringent tastes in FIG. 2.

Figure 7:
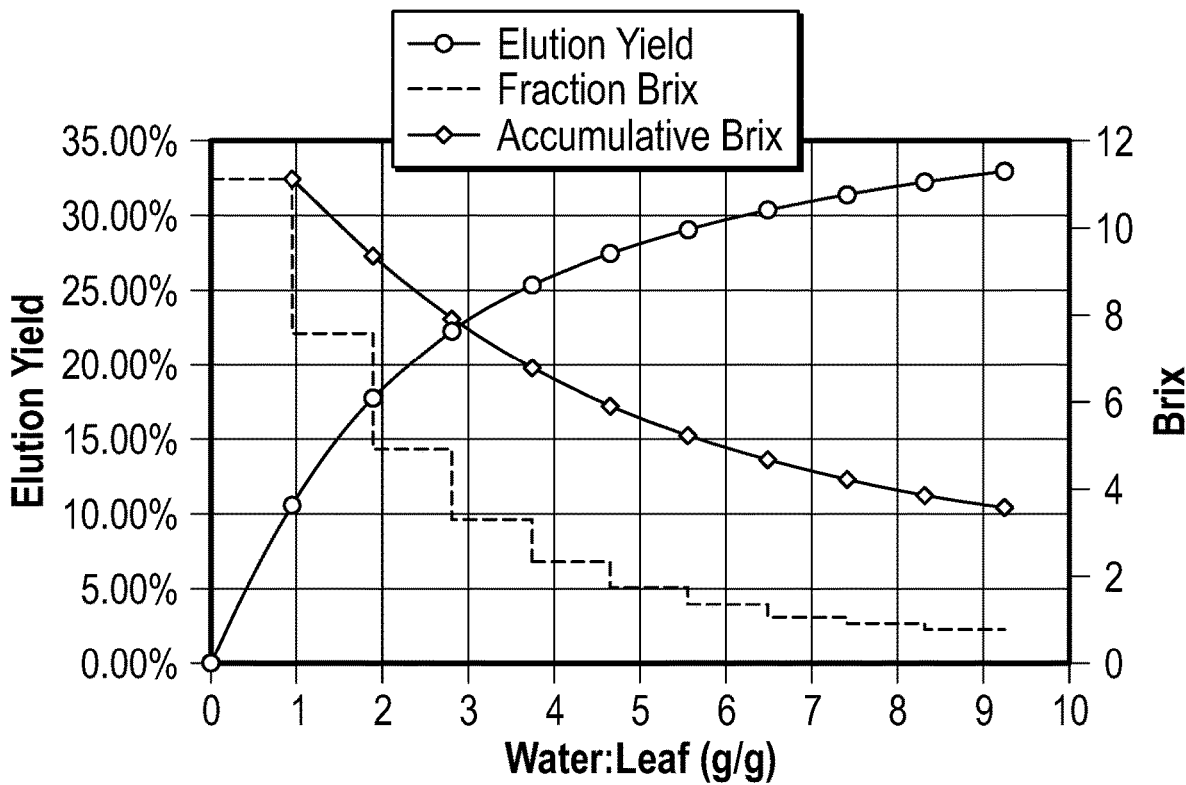
FIG. 7 is a curve of variation in degrees Brix and extraction yield during extraction of green tea.

The method of this example can achieve an extraction yield of 32.9% (FIG. 7). As FIG. 7 shows, as the mass ratio of water to green tea increases, the extraction yield gradually rises, while the cumulative degrees Brix gradually falls. When the elution efficiency is 25%, a tea concentrate of higher than 7 degrees Brix can be obtained.

Example 2

Method for Preparing Black Tea Extracts Having Different Tastes 600 g of black broken tea (CTC black tea) is packed into an extraction column, hot water at 90° C. is supplied continuously at a flow rate which progressively decreases along a gradient from 200 mL/min to 20 mL/min to perform extraction; once extraction begins, liquid extract is collected immediately until the volume ratio of water to tea is 1:1, to obtain a first-section liquid extract; second- to seventh-section liquid extracts are collected by the same principle according to the same volume ratio of water to tea.

The pressure during extraction is 0.1 Mpa-2 Mpa.

Figure 8:
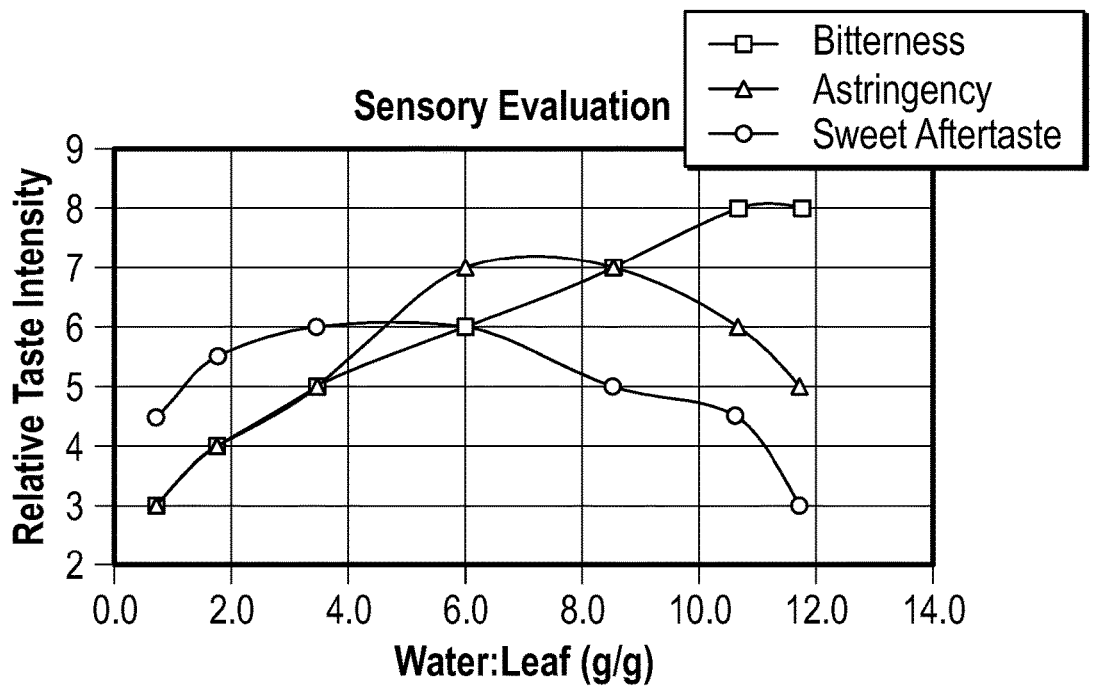
FIG. 8 is a relative taste intensity curve for a black tea liquid extract.

Relative taste curves for bitter taste, astringent taste, umami and sweet aftertaste in the black tea extract are drawn:

1) the 7 portions of liquid extract are used as samples;

2) a black tea brew obtained by adding hot water at 80° C. at a mass ratio of tea to water of 1:50 and steeping for 10 minutes is used as a reference;
3) the samples and the reference are formulated to be of a single concentration of 0.2 Brix;
4) an evaluation group performs sensory evaluation of the samples obtained in step 3), wherein the evaluation group is composed of 20 professional judges, who score the strengths of the bitter taste, astringent taste and sweet aftertaste of each sample, and take a mean value of the scores as a final score which is the relative taste intensity of the sample;
5) a relative taste curve is drawn, with the mass ratio of water to tealeaves as the horizontal coordinate and the relative taste intensity of the sample as the vertical coordinate, as shown in FIG. 8.

It can be seen from FIG. 8 that the relative taste intensities of the bitter taste, astringent taste and sweet aftertaste of the black tea liquid extract are lower in an initial stage, then gradually increase, and finally fall again.

According to the taste variation shown in FIG. 8, collected liquid extracts of different sections are combined, or after recombination are mixed with milk, fruit juice or plant extract; the present invention provides the following methods of combination by way of example:
1) preparation of pure black tea: the first 5 portions of black tea liquid extract collected are recombined, to form a beverage having the taste of pure, high grade black tea; this beverage has an intensified sweet aroma balanced with a good color and lustre, and also has less of a bitter and astringent taste.
2) preparation of milk tea: the last 4 portions of black tea liquid extract collected are recombined, to serve as a basis for milk tea, and are mixed with fresh milk, to form milk tea having a high grade taste and aroma.
3) preparation of fruit juice tea: the first 5 portions of black tea liquid extract collected are recombined, and natural fruit juice and plant extract are added, to realize an outstanding multi-layered sensory experience, wherein the natural fruit juice comprises peach juice, lemon juice, etc., and the plant extract comprises jujube fruit juice, etc.

Furthermore, the present invention also determined the concentration of amino acids, total polyphenols, theaflavins and caffeine in the 7 collected samples, to analyze the correlation between the concentration of these substances in black tea and the taste of the black tea liquid extract.

The present invention determined the relative concentration of each of these substances by an LC-MS method; the results are shown in FIGS. 9-12.

Figure 9:
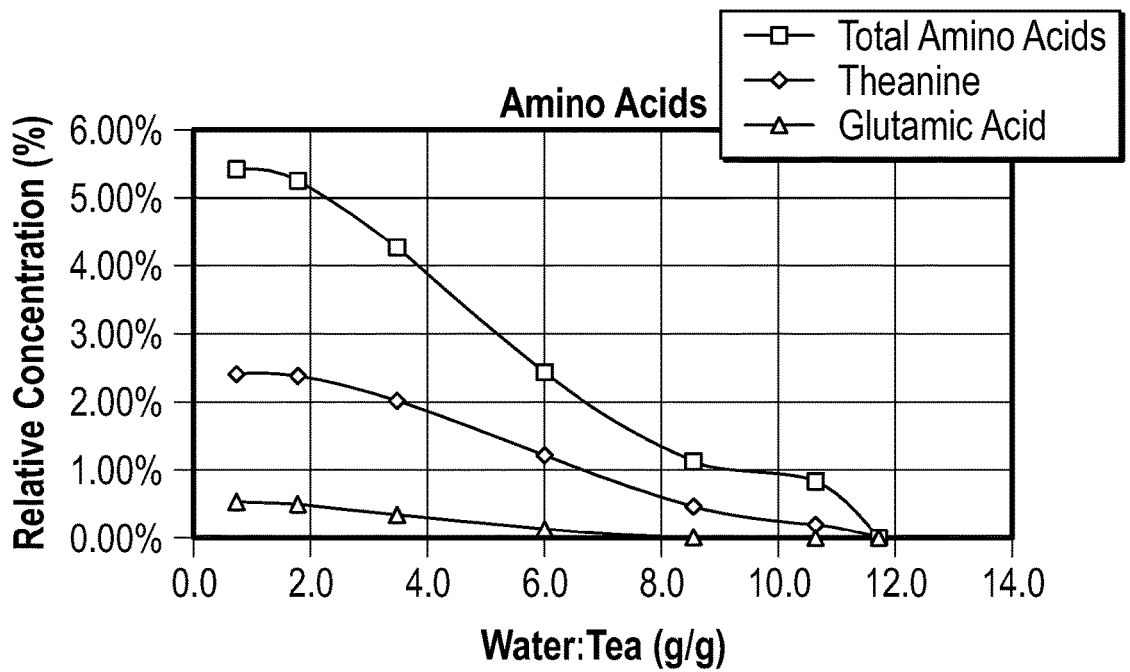
FIG. 9 is a curve of variation in relative concentration of amino acids during extraction of black tea.

FIG. 9 shows a drawing of the variation in relative concentration of theanine, glutamic acid and total amino acids during extraction of black tea, wherein theanine and glutamic acid are the main sources of the umami FIG. 9 shows that the relative concentrations of theanine and glutamic acid are higher in an early stage of black tea extraction, then rapidly fall.

Figure 10:
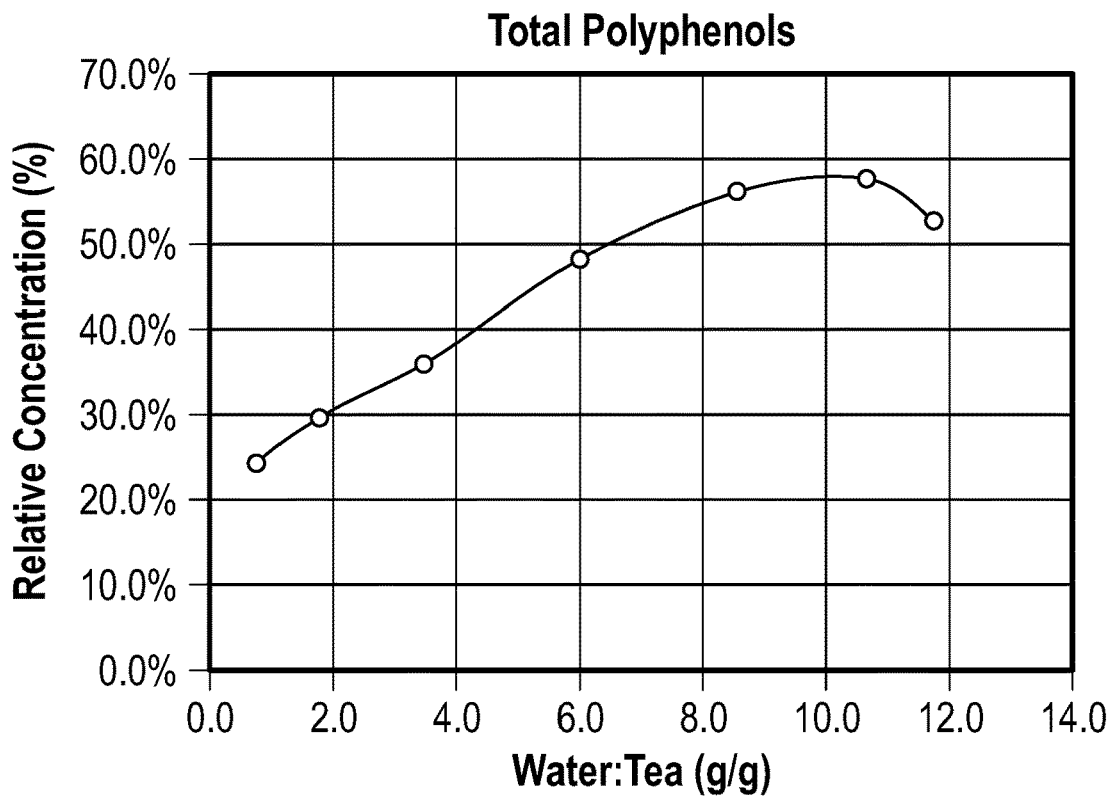
FIG. 10 is a curve of variation in relative concentration of total polyphenols during extraction of black tea.
Figure 11:
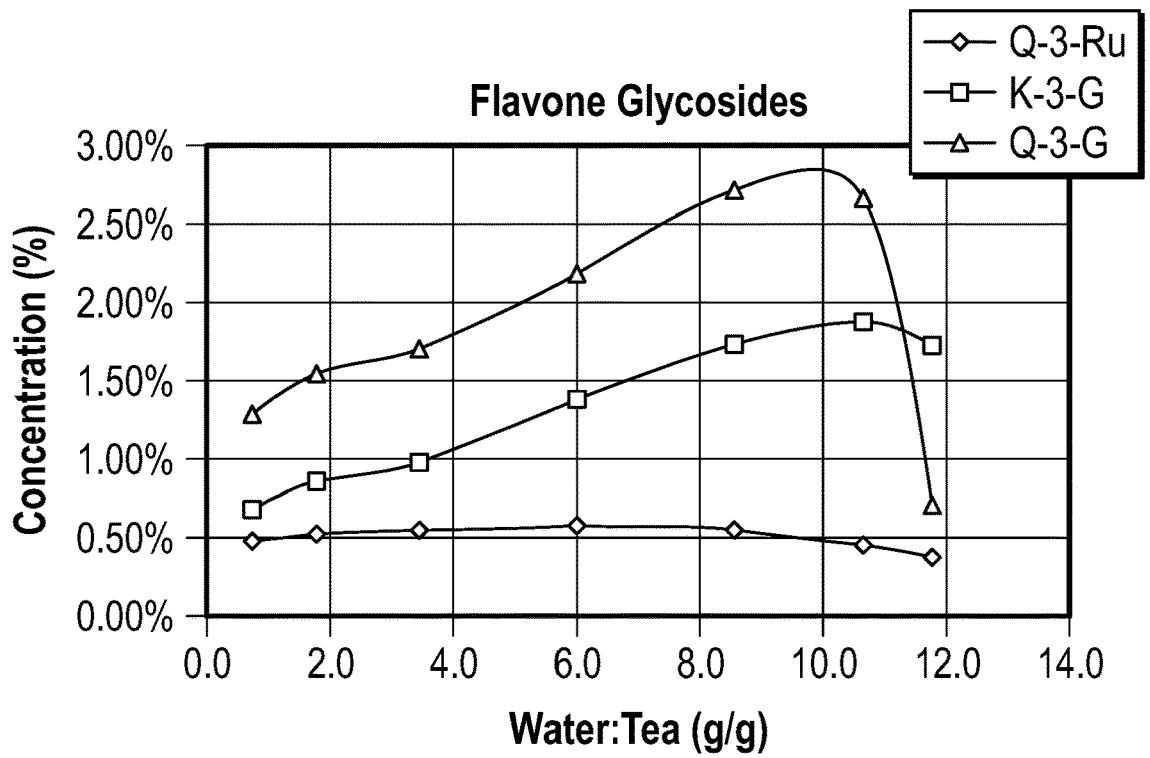
FIG. 11 is a curve of variation in relative concentration of flavone glycosides during extraction of black tea.
Figure 12:
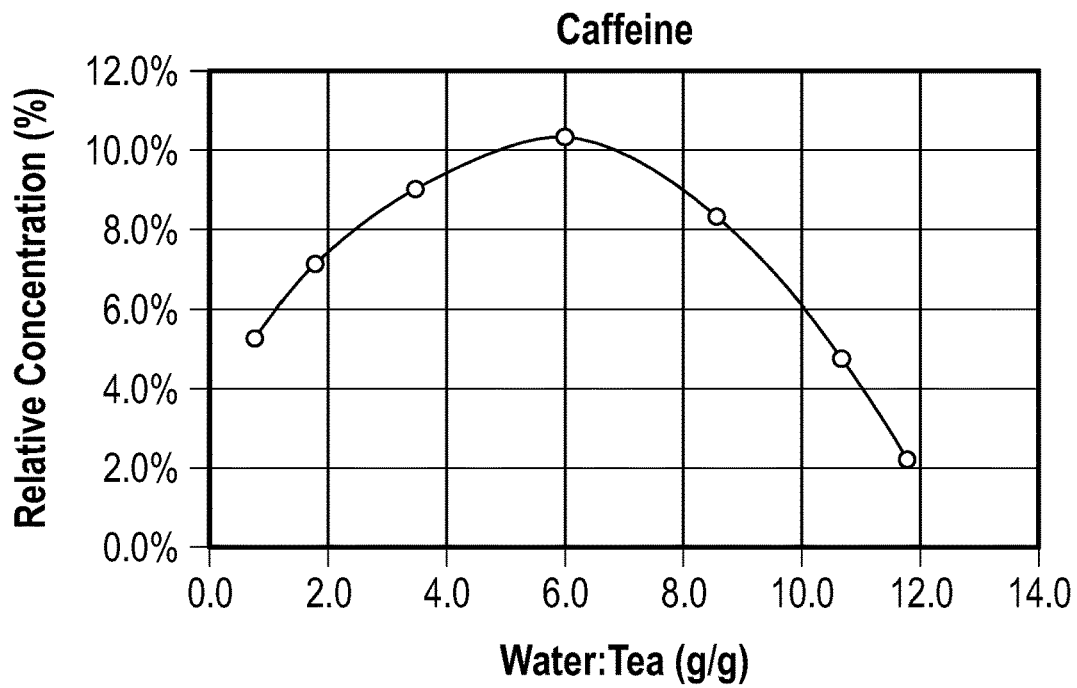
FIG. 12 is a curve of variation in relative concentration of caffeine during extraction of black tea.

FIGS. 10-12 show drawings of the variation in relative concentration of total polyphenols, theaflavins and caffeine during extraction of black tea, wherein these three substances are the main sources of astringent and bitter tastes. It can be seen from FIGS. 9-12 that the relative concentrations of these three substances are lower in an initial stage of black tea extraction, then rise, then show a falling trend; this is the same as the trends in variation of the relative taste curves for bitter and astringent tastes in FIG. 8.

Figure 13:
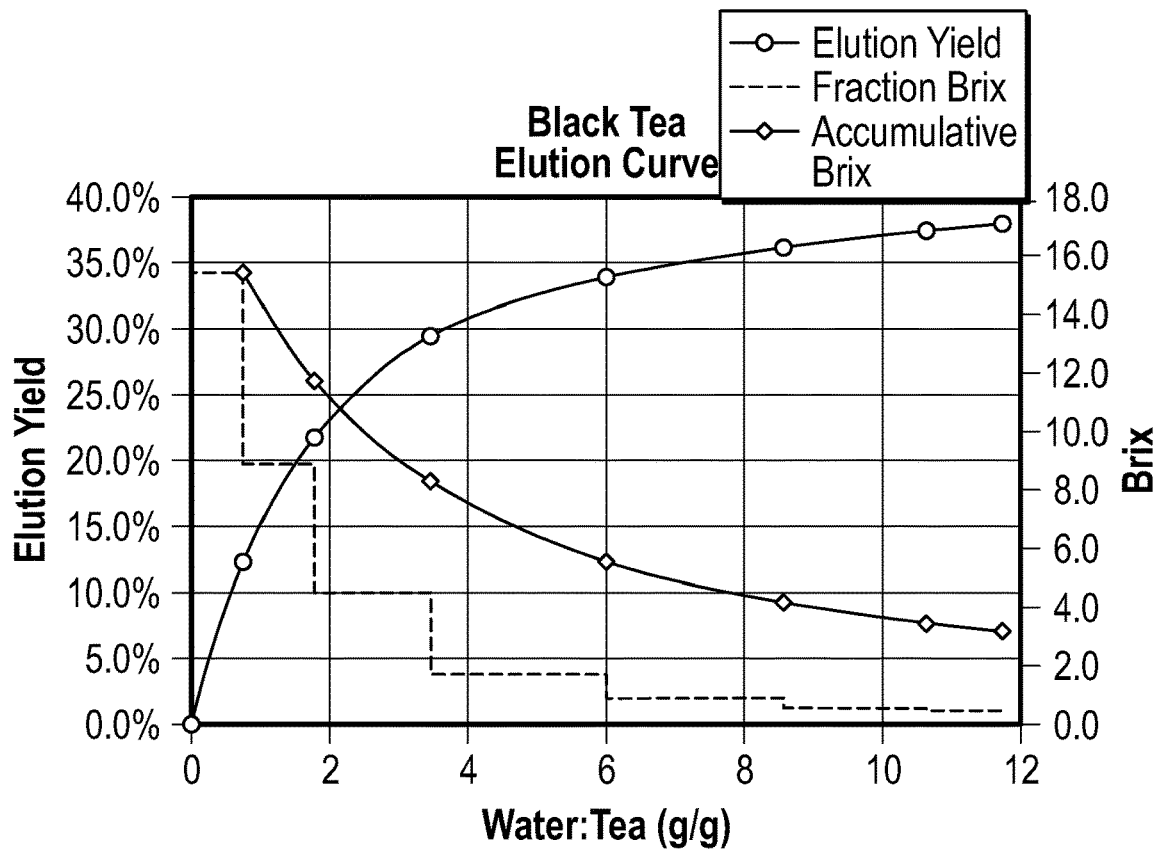
FIG. 13 is a curve of variation in degrees Brix and extraction yield during extraction of black tea.

The method of this example can achieve an extraction yield of 38% (see FIG. 13), far higher than the extraction yield of 26% in conventional industrial extraction methods. Moreover, when the extraction yield is 25%, a liquid extract of 10 degrees Brix can be obtained, and at this time the mass ratio of tea to water is only 1:3, thus a highly concentrated black tea concentrate can be obtained without the need for a concentration step.

Obviously, the above examples of the present invention are merely examples given for the purpose of clearly explaining the present invention, which do not limit the embodiments thereof. Those skilled in the art could make other alterations and changes of different forms on the basis of the above description. It is not possible to set out all embodiments here exhaustively. All obvious extended alterations or changes belonging to the technical solution of the present invention shall still fall within the scope of protection thereof.

The invention claimed is:

1. A method for preparing tea leaf extracts having different tastes, the method comprising the following steps:
   1) packing tea leaves into an extraction column, performing continuous extraction using water at 5° C.-140° C. at a flow rate of 20-200 mL/min, collecting liquid extracts in sections, and drawing a relative taste intensity curve; wherein the relative taste intensity curve is selected from a bitter taste curve, an astringent taste curve, an umami curve, a sweet aftertaste curve or a combination thereof;
   2) according to a taste variation shown in the relative taste intensity curve, recombining collected liquid extracts of different sections.

2. The method as claimed in claim 1, further comprising mixing with milk, fruit juice or plant extract after recombining liquid extracts of different sections.

3. The method as claimed in claim 1, wherein water at 40° C.-100° C. is used to perform extraction.

4. The method as claimed in claim 1, wherein water at 60° C.-90° C. is used to perform extraction.

5. The method as claimed in claim 1, wherein the pressure during extraction is 0.1 Mpa-2 Mpa.

6. The method as claimed claim 1, wherein the temperature, flow rate and/or pressure vary linearly or non-linearly during extraction.

7. The method as claimed in claim 1, wherein water is passed from a bottom end of the extraction column to a top end to perform extraction.

8. The method as claimed in claim 1, wherein the relative taste curve is drawn by using an evaluation group composed of professional judges to perform scoring.

9. The method as claimed in claim 1, wherein the tea leaves are green tea, black tea, dark tea, oolong tea, yellow tea, white tea or a combination thereof.

10. The method as claimed in claim 2, wherein the plant extract is selected from an extract of *chrysanthemum*, goji or *Siraitia grosvenorii*.

11. A tea beverage containing tea leaf extracts made by the method as claimed in claim 1,
   wherein the collected liquid extracts that are recombined correspond to fewer than all of collected liquid extracts.

12. A tea beverage containing tea leaf extracts made by the method as claimed in claim 2,
   wherein the collected liquid extracts that are recombined correspond to fewer than all of collected liquid extracts.

* * * * *